United States Patent Office 3,221,039
Patented Nov. 30, 1965

3,221,039
STABILIZATION OF ALKYLLEADS
Shirl E. Cook and Thomas O. Sistrunk, Baton Rouge, La.,
  assignors to Ethyl Corporation, New York, N.Y., a
  corporation of Virginia
No Drawing. Filed Oct. 30, 1963, Ser. No. 320,003
The portion of the term of the patent subsequent to
  Mar. 12, 1980, has been disclaimed
9 Claims. (Cl. 260—437)

This invention relates to thermally stabilized mixed methyl and ethyl lead compositions. It also relates to methods for inhibiting the thermal decomposition of certain mixtures of tetraalkyllead compounds.

According to the invention, we provide a thermally stabilized alkyllead composition comprising a mixture of tetraalkyllead compounds in which from 10 to 90 percent of the radicals are the methyl radical, the balance being ethyl radicals, and containing in amounts sufficient to inhibit thermal decomposition:

(1) A hydrocarbon having a boiling point at atmospheric pressure between 90 and 150° C., said hydrocarbon consisting of alkanes or mononuclear aromatics containing only aromatic unsaturation and being present in amount such that there are from about 2 to about 40 (preferably 5 to 30) parts by weight thereof per each 100 parts by weight of said mixture; and
(2) Ethylene dichloride or propylene dichloride present in amount such that there are from about 1.3 to about 1.8 moles (preferably 1.5 to 1.7 moles) thereof per mole of tetraalkyllead compounds in said mixture.

This dichloride ingredient serves a dual function. It contributes substantial thermal stability to the overall composition and it serves as the sole halohydrocarbon scavenger ingredient of the final antiknock fluid composition.

We also provide an improved process for separating the alkyllead mixtures from the reaction products accompanying their synthesis and a method for inhibiting thermal decomposition of these methyl-ethyl lead mixtures during their formation via the redistribution reaction as well as during their purification and blending with other products in making commercial antiknock fluids. This invention also minimizes thermal decomposition during storage and transportation of these mixed alkyllead products. It especially prevents thermal decomposition of undiluted mixtures of these alkyllead compounds where the likelihood of thermal decomposition is more of a problem.

As is well known, there are several methods for producing mixtures of tetraalkyllead compounds of the type described herein. One such method is the so-called "redistribution reaction," whereby the methyl and ethyl radicals of the initial tetraalkyllead compound or mixture of compounds are caused to interchange by means of a catalyst. For example, an initial mixture of tetraethyllead and tetramethyllead can be caused to redistribute by means of an appropriate catalyst into a mixture containing varying proportion of the 5 possible compounds: tetramethyllead, ethyltrimethyllead, diethyldimethyllead, triethylmethyllead and tetraethyllead.

Another process for producing these methyl-ethyl lead mixtures comprises reacting ethyl chloride and a methyl halide with a sodium lead alloy in the presence of a catalyst.

Still another method of producing these alkyllead mixtures is via a combination of the redistribution process with the above-described sodium lead alloy manufacturing process.

A still further method of producing the methylethyllead mixtures stabilized in accordance with this invention is to separately prepare each of the individual members of the intended mixture by means of known techniques and then to blend these materials in the desired proportions.

In some of the foregoing processes the mixed tetraalkyllead compounds so-produced are in admixture with various reaction products from which the mixed methyl and ethyl lead compounds must be separated. This separation is effected by steam or vacuum distillation with subsequent purification of the tetraalkyllead distillate. Due to the toxic and unstable nature of these mixed tetraalkyllead compounds, these distillation and purification operations are subject to many difficulties.

In these distillation and purification operations meticulous temperature control and exact safety measures are of paramount importance. The rates of decomposition of the alkyllead mixtures increase very rapidly with small rises in temperatures above the temperature where decomposition becomes appreciable. For example, decomposition of tetraethyllead itself occurs at the rate of approximately 2 percent per hour at a temperature of 100° C. which is the customary temperature used in separating this particular compound from the reaction products accompanying its synthesis. At temperatures above 100° C. the decomposition rate increases logarithmically so that a point is soon reached where external heat is no longer required and decomposition becomes self-propagating. The decomposition rates of the other tetraalkyllead antiknock compounds (i.e. tetramethyllead, ethyltrimethyllead, diethyldimethyllead and triethylmethyllead) and the various mixtures thereof (with and without tetraethyllead) are generally comparable. In short, any mixture of tetraalkyllead compounds in which the alkyl groups are methyl and ethyl radicals, 10 to 90 percent being methyl and the balance ethyl, can undergo violent decomposition reactions at temperatures ranging from between about 100 and about 195° C. If these compounds are in a partial or total confinement a violent explosion may ensue.

Such likelihood of excessive decomposition is also present during the redistribution process for preparing these mixtures of tetraalkyllead compounds. This is borne out for example by the fact that a catalyst is employed in effecting this redistribution reaction and most of these catalysts will undergo exothermic reactions if inadvertently contacted with moisture. Furthermore trace impurities may find their way into the concentrated mixture of tetraalkyllead compounds before, during or after the redistribution process and some of these impurities on exposure to air or moisture can give rise to the formation of hot spots which would lead to the inception of pronounced thermal decomposition. Hence, there is a need for an effective method of inhibiting runaway thermal decomposition during these catalytic redistribution reactions.

The likelihood of excessive decomposition is also present during such operations as blending, handling, storage and transportation. Prior to diluting the mixed tetraalkyllead concentrates with scavengers, gasoline or other materials the alkyllead compounds remain as a concentrate and the problem of excessive decomposition exists even though the temperature is maintained normally well below that of decomposition. For example, in purification steps wherein the concentrate is washed and blown with air at atmospheric temperature to remove impurities a sudden increase in temperature may occur due to the oxidation of methyl and ethyl bismuth compounds which may be and frequently are present as impurities. Also pumps used in handling these tetraalkyllead mixtures occasionally "freeze" and the friction developed may cause a local overheating to a temperature above the decomposition temperature. Faulty wiring, leaks onto steam pipes, and other accidental causes also may produce local overheating with resulting dangerous decomposition.

It is seen therefore that in those operations where these alkyllead mixtures are in the substantially undiluted or concentrated state—the likelihood of excessive thermal decomposition must be provided for and effectively combatted. By using the above thermal stabilizer mixture (i.e. the hydrocarbon and the dichloride ingredients) in any of the foregoing operations, significant thermal stability is provided. Furthermore, the final antiknock fluid composition is particularly well suited for use as an antiknock additive for gasoline, the dichloride ingredient thereafter eliminating excessive engine deposit formation and severe engine durability problem (e.g. reduced exhaust valve life, prematurely short spark plug life) and the hydrocarbon ingredient contributing to fuel value of the ultimate finished gasoline. The mononuclear aromatics as above described especially toluene, the xylenes, and ethyl benzene are preferred hydrocarbon components for use in this invention as they contribute materially to the thermal stability of the concentrated alkyllead mixtures and they usually enhance and seldom, if ever, detract from the octane quality of the gasolines with which the present antiknock fluids are blended. In some instances benzene itself is suitable although preferably other mononuclear aromatics (e.g. toluene, xylene) will be associated therewith. Other suitable compounds include isooctane (i.e. 2,2,4-trimethylpentane), 2-methylhexane, n-octane, and nonane.

Essentially the only halohydrocarbon ingredient used in the compositions of the present invention is ethylene dichloride or propylene dichloride, or both, with or without small added quantities of 1,1-dichloroethane.

We stabilize any mixture of 2 or more of the compounds tetramethyllead, ethyltrimethyllead, diethyldimethyllead, triethylmethyllead and tetraethyllead so long as from 10 to 90 percent of the alkyl radicals in the mixture are methyl with the remainder being ethyl. Therefore, the invention can be applied in the stabilization of various 2-, 3- and 4-component mixtures of tetraalkyllead compounds. The stabilizers may be used in various mixtures containing each of the 5 tetraalkyllead compounds described above. Not only are these 5-component mixtures very effectively stabilized but they have been found to possess excellent properties when used as antiknock agents in gasoline. Several examples of these preferred 5-component systems (all percentages are by weight) are as follows:

(1) 0.4 percent tetramethyllead, 4.3 percent ethyltrimethyllead, 20.2 percent diethyldimethyllead, 42.1 percent triethylmethyllead, and 33.0 percent tetraethyllead (one-fourth of the alkyl groups are methyl);
(2) 5.7 percent tetramethyllead, 23.8 percent ethyltrimethyllead, 37.4 percent diethyldimethyllead, 26.2 percent triethylmethyllead, and 6.9 percent tetraethyllead (one-half of the alkyl groups are methyl);
(3) 30.0 percent tetramethyllead, 42.1 percent ethyltrimethyllead, 22.2 percent diethyldimethyllead, 5.2 percent triethylmethyllead, and 0.5 percent tetraethyllead (three-fourths of the alkyl groups are methyl).

*Example I*

Admixed in a blending tank are an equimolar mixture of tetraethyllead and tetramethyllead, mixed xylenes (o-, m- and p-isomers) and ethylene dichloride. The amount of xylenes used is equivalent to 5 parts by weight per each 100 parts by weight of the tetraalkyllead mixture. The ethylene dichloride is used in amount equivalent to 1.3 moles per mole of the combined tetraalkyllead compounds.

*Example II*

Admixed in a blending tank are an equimolor mixture of tetraethyllead and tetramethyllead, along with 2,2,4-trimethylpentane and ethylene dichloride. The amount of 2,2,4-trimethylpentane used is equivalent to 10 parts by weight per each 100 parts by weight of the tetraalkyllead mixture. The ethylene dichloride is used in amount equivalent to 1.8 moles per mole of the combined tetraalkyllead compounds.

*Example III*

Blended with a mixture of triethylmethyllead and ethyltrimethyllead in a molar ratio of 3:1 respectively are 2-methyl-3-ethyl-pentane (30 parts by weight per each 100 parts by weight of the tetraalkyllead mixture) and a mixture composed of 80 mole percent of ethylene dichloride and 20 mole percent of 1,1-dichloroethane in amount such that there are 1.5 moles of this last-named mixture per mole of the mixture of tetraalkyllead compounds.

*Example IV*

Blended with a mixture of tetramethyllead and tetraethyllead in a molar ratio of 3:1 respectively are ethyl benzene (40 parts by weight per each 100 parts by weight of the tetraalkyllead mixture) and ethylene dichloride in amount such that there are 1.7 moles per mole of the mixture of tetraalkyllead compounds.

*Example V*

Admixed in a blending tank are an equimolar mixture of tetraethyllead and tetramethyllead, toluene and ethylene dichloride. The amount of toluene used is equivalent to 15 parts by weight per each 100 parts by weight of the tetraalkyllead mixture. The ethylene dichloride is used in amount equivalent to 1.5 moles per mole of the combined tetraalkyllead compounds.

The compositions of Examples 1–5, inclusive, possess enhanced thermal stability even when subjected to temperatures as high as 195° C.

*Example VI*

Placed in a reaction vessel are 1 mole of tetraethyllead, 1 mole of tetramethyllead, nonane, and 1.8 moles of ethylene dichloride, the amount of nonane being such that there are 30 parts thereof per each 100 parts by weight of the tetraalkyllead compounds. Thereupon 0.025 mole of anhydrous aluminum chloride is added to the system, the resulting mixture is stirred and the temperature is raised to about 85° C. where it is maintained for 2 hours so as to effect a redistribution into the resultant mixture of the 5 possible tetraalkyllead compounds.

An optional alternative in the redistribution process is to use a still lower boiling hydrocarbon such as hexane along with the thermal stabilizer combinations of this invention. In this way this lower boiling hydrocarbon can serve and implement the stabilizer combination as a convenient redistribution reaction solvent. This lower boiling hydrocarbon can then be distilled off upon completion of the reaction. To illustrate this procedure, the process of Example VI is repeated except that there is additionally present in the reactor 150 parts by weight of n-hexane and the reaction mixture is kept at 65° C. As indicated, this amount of hexane can be removed from the ensuing redistribution product by distillation, if desired.

*Example VII*

Placed into an autoclave equipped with a stirrer and with a jacket having suitable connections for controlling the temperature with steam or with water are, by weight, 1380 parts of the sodium-lead alloy, NaPb, 160 parts of methyl chloride, 416 parts of ethyl chloride, and a catalyst consisting of 2 parts of an aluminum alloy and 4 parts of anhydrous aluminum chloride. The aluminum alloy used contains about 7.5 percent copper, 1.5 percent zinc, 1.2 percent iron, and 1.5 percent silicon, the balance being aluminum. This alloy is used in the form of chips small enough to pass through a 20-mesh screen. The contents of the autoclave are then stirred and maintained at about 100° C. for 4 hours. Next the autoclave is cooled and vented, and the reaction mass is discharged into a still equipped with an agitator and steam jets. At this point toluene and ethylene dichloride are introduced into the steam still in relative amounts such that per each 100 parts by weight of the tetraalkyllead product there are 20 parts by weight of toluene, the ethylene dichloride concentration being equivalent to 1.6 moles per each mole of the tetraalkyllead product. Thereupon the entire mixture is subjected to steam distillation, the alkyllead compounds formed during the process, toluene, and ethylene dichloride distilling over with the steam, the alkylleads being protected against thermal decomposition during this operation by the use and copresence of the thermal stabilizer system of this invention.

*Example VIII*

Blended with a mixture composed of 2 moles each of tetramethyllead and tetraethyllead and 1 mole of diethyldimethyllead are 2,4-dimethyl hexane, toluene and ethylene dichloride. The hydrocarbon components are each used in amount equivalent to 5 parts by weight per each 100 parts by weight of the tetraalkyllead mixture. The amount of ethylene dichloride used is equivalent to 1.4 moles thereof per mole of the tetraalkyllead mixture.

*Example IX*

The following systems are prepared in suitable blending apparatus:

(a) Tetraethyllead and tetramethyllead in a molar ratio of 9:1 respectively;
Toluene (5 parts by weight per each 100 parts by weight of the tetraalkyllead mixture);
Ethylene dichloride (1.5 moles per mole of the combined tetraalkyllead compounds).

(b) Tetraethyllead and tetramethyllead in a molar ratio of 4:1 respectively;
Toluene (7.5 parts by weight per each 100 parts by weight of the tetraalkyllead mixture);
Ethylene dichloride (1.5 moles per mole of the combined tetraalkyllead compounds).

(c) Tetraethyllead and tetramethyllead in a molar ratio of 3:1 respectively;
Toluene (10 parts by weight per each 100 parts by weight of the tetraalkyllead mixture);
Ethylene dichloride (1.5 moles per mole of the combined tetraalkyllead compounds).

(d) Tetraethyllead and tetramethyllead (equimolar mixtures);
Toluene (20 parts by weight per each 100 parts by weight of the tetraalkyllead mixture);
Ethylene dichloride (1.5 moles per mole of the combined tetraalkyllead compounds).

(e) Tetraethyllead and tetramethyllead in a molar ratio of 1:3 respectively;
Toluene (15 parts by weight per each 100 parts by weight of the tetraalkyllead mixture);
Ethylene dichloride (1.5 moles per mole of the combined tetraalkyllead compounds).

(f) Tetraethyllead and tetramethyllead in a molar ratio of 1:4 respectively;
Toluene (12.5 parts by weight per each 100 parts by weight of the tetraalkyllead mixture);
Ethylene dichloride (1.5 moles per mole of the combined tetraalkyllead compounds).

(g) Tetraethyllead and tetramethyllead in a molar ratio of 1:9 respectively;
Toluene (35 parts by weight per each 100 parts by weight of the tetraalkyllead mixture);
Ethylene dichloride (1.5 moles per mole of the combined tetraalkyllead compounds).

(h) 0.4 percent tetramethyllead, 4.3 percent ethyltrimethyllead, 20.2 percent diethyldimethyllead, 42.1 percent triethylmethyllead, and 33.0 percent tetraethyllead;
Toluene (5 parts by weight per each 100 parts by weight of the tetraalkyllead mixture);
Ethylene dichloride (1.5 moles per mole of the combined tetraalkyllead compounds).

(i) 5.7 percent tetramethyllead, 23.8 percent ethyltrimethyllead, 37.4 percent diethyldimethyllead, 26.2 percent triethylmethyllead, and 6.9 percent tetraethyllead;
Toluene (10 parts by weight per each 100 parts by weight of the tetraalkyllead mixture);
Ethylene dichloride (1.5 moles per mole of the combined tetraalkyllead compounds).

(j) 30.0 percent tetramethyllead, 42.1 percent ethyltrimethyllead, 22.2 percent diethyldimethyllead, 5.2 percent triethylmethyllead, and 0.5 percent tetraethyllead;
Toluene (15 parts by weight per each 100 parts by weight of the tetraalkyllead mixture);
Ethylene dichloride (1.5 moles per mole of the combined tetraalkyllead compounds).

*Example X*

Example IX is repeated except that in each instance 1.7 moles of ethylene dichloride per mole of the combined tetraalkyllead compounds is employed.

The nature of the hydrocarbon components of the thermal stabilizer systems will now be well understood by those skilled in the art. Typical of the alkanes and mononuclear aromatics containing only aromatic unsaturation (boiling points: 90 to 150° C.) are ethylbenzene, toluene, p-xylene, m-xylene, o-xylene, mixed xylene isomers, 2,2,3,3-tetramethylbutane, 2,3-dimethyl pentane, 3-ethyl pentane, 3-ethyl-2-methyl pentane, 3-ethyl-3-methyl pentane, 2,2,4-trimethyl pentane, 2,3-dimethyl hexane, 2,4-dimethyl hexane, 2,5-dimethyl hexane, 3.4-dimethyl hexane, 3-ethyl hexane, 2-methyl hexane, 3-methyl hexane, n-heptane, 2-methyl heptane, 3-methyl heptane, 4-methyl heptane, n-octane, 3-methyl octane, and n-nonane. Excellent results are achieved not only by the use of the individual compounds but by use of mixtures of the foregoing compounds, especially mixtures which are readily available on a commercial basis at low cost. Mixed xylenes, mixed dimethyl hexanes, mixed methyl heptanes, and various gasoline fractions boiling in or throughout the range from 90 to 150° C. serve as examples.

This invention is well adapted to the stabilization of the above-described tetraalkyllead mixtures at various stages after they have been formed and the diluents and excess alkyl halide have been discharged from the autoclave. Such a procedure is illustrated by Example VII. In this way the danger arising from unexpected temperature increases is substantially eliminated.

The thermal stabilizer combinations may be employed to stabilize the mixed tetraalkyllead compounds, both in storage and in shipping and especially to stabilize any mixed tetraalkyllead concentrates, i.e., compositions containing at least 80 percent by weight of the mixed tetraethyllead compounds. In this way most of the hazards involved in the event of accidental exposure to elevated temperature will economically and satisfactorily be eliminated. Furthermore, waste of the valuable tetraalkyllead products due to decomposition is considerably minimized through the use of this invention.

Certain other well known alkyllead thermal stabilizer materials can be effectively used in conjunction with the thermal stabilizer complements. In this way the effectiveness of the present thermal stabilizer complements can be implemented. Examples of such known alkyllead thermal stabilizers include styrene, 2-ethyl-1,3-hexanediol, furfural, 2-methyl-2,4-pentanediol, and resorcinol.

We claim:

1. A thermally stabilized composition consisting essentially of
   (1) a concentrated mixture of tetraalkyllead compounds in which about 10 percent of the alkyl radicals are methyl, the balance being ethyl;
   (2) a hydrocarbon having a boiling point at atmospheric pressure between about 90 and 150° C., said hydrocarbon being selected from the group consisting of alkanes and mononuclear aromatics containing only aromatic unsaturation and being present in amount such that there are from about 2 to about 5 parts by weight thereof per each 100 parts by weight of said mixture; and
(3) a halohydrocarbon selected from the group consisting of ethylene dichloride and propylene dichloride present as essentially the sole halohydrocarbon ingredient of the composition and present in amount such that there are from about 1.5 to about 1.7 moles thereof per mole of tetraalkyllead compounds in said mixture.

2. The composition of claim 1 wherein said mixture of tetraalkyllead compounds consists of tetramethyllead and tetraethyllead.

3. The composition of claim 1 wherein said mixture of tetraalkyllead compounds consists of tetramethyllead, ethyltrimethyllead, diethyldimethyllead, triethylmethyllead and tetraethyllead.

4. A thermally stabilized composition consisting essentially of
(1) a concentrated mixture of tetraalkyllead compounds in which about 10 percent of the alkyl radicals are methyl, the balance being ethyl;
(2) a mononuclear aromatic hydrocarbon containing only aromatic unsaturation and having a boiling point at atmospheric pressure between about 90 and 150° C., said hydrocarbon being present in amount such that there are from about 2 to about 5 parts by weight thereof per each 100 parts by weight of said mixture; and
(3) a halohydrocarbon selected from the group consisting of ethylene dichloride and propylene dichloride present as essentially the sole halohydrocarbon ingredient of the composition and present in amount such that there are from about 1.5 to about 1.7 moles thereof per mole of tetraalkyllead compounds in said mixture.

5. The composition of claim 4 wherein said mixture of tetraalkyllead compounds consists of tetramethyllead and tetraethyllead.

6. The composition of claim 4 wherein said mixture of tetraalkyllead compounds consists of tetramethyllead, ethyltrimethyllead, diethyldimethyllead, triethylmethyllead and tetraethyllead.

7. A thermally stabilized composition consisting essentially of
(1) a concentrated mixture of tetraalkyllead compounds in which about 10 percent of the alkyl radicals are methyl, the balance being ethyl;
(2) toluene present in amount such that there are from about 2 to about 5 parts by weight thereof per each 100 parts by weight of said mixture; and
(3) a halohydrocarbon selected from the group consisting of ethylene dichloride and propylene dichloride present as essentially the sole halohydrocarbon ingredient of the composition and present in amount such that there are from about 1.5 to about 1.7 moles thereof per mole of tetraalkyllead compounds in said mixture.

8. The composition of claim 7 wherein said mixture of tetraalkyllead compounds consists of tetramethyllead and tetraethyllead.

9. The composition of claim 7 wherein said mixture of tetraalkyllead compounds consists of tetramethyllead, ethyltrimethyllead, diethyldimethyllead, triethylmethyllead and tetraethyllead.

References Cited by the Examiner

UNITED STATES PATENTS

| 2,270,108 | 1/1942 | Calingaert et al. | 260—437 |
| 3,081,326 | 3/1963 | Cook | 260—437 |
| 3,083,086 | 3/1963 | Case et al. | 252—386 |

TOBIAS E. LEVOW, *Primary Examiner.*